US012212392B2

(12) United States Patent
Bengtsson et al.

(10) Patent No.: US 12,212,392 B2
(45) Date of Patent: Jan. 28, 2025

(54) ANGLE-OF-ARRIVAL DEPENDENT RE-CONFIGURABLE REFLECTIVE DEVICES (71) Applicant: Sony Group Corporation, Tokyo (JP)

(72) Inventors: Erik Bengtsson, Eslöv (SE); Jose Flordelis, Lund (SE); Fredrik Rusek, Eslöv (SE); Kun Zhao, Malmö (SE); Olof Zander, Södra Sandby (SE)

(73) Assignee: Sony Group Corporation, Tokyo (JP)

( * ) Notice: Subject to any disclaimer, the term of this patent is extended or adjusted under 35 U.S.C. 154(b) by 66 days.

(21) Appl. No.: 18/008,622

(22) PCT Filed: Jun. 23, 2021

(86) PCT No.: PCT/EP2021/067218
§ 371 (c)(1),
(2) Date: Dec. 6, 2022

(87) PCT Pub. No.: WO2021/260047
PCT Pub. Date: Dec. 30, 2021

(65) Prior Publication Data
US 2023/0224003 A1 Jul. 13, 2023

(30) Foreign Application Priority Data
Jun. 26, 2020 (SE) .................... 2030213-9

(51) Int. Cl.
H04B 7/06 (2006.01)
H04B 7/08 (2006.01)

(52) U.S. Cl.
CPC ......... *H04B 7/0621* (2013.01); *H04B 7/0617* (2013.01); *H04B 7/086* (2013.01)

(58) Field of Classification Search
CPC .... H04B 7/0621; H04B 7/0617; H04B 7/086; H04B 7/04013; H01Q 3/46
See application file for complete search history.

(56) References Cited

U.S. PATENT DOCUMENTS

2011/0208481 A1* 8/2011 Slastion ............... G01S 3/74
702/189
2012/0258729 A1* 10/2012 Siomina ............... G01S 5/08
455/456.1
(Continued)

FOREIGN PATENT DOCUMENTS

CN 101364828 A 2/2009
CN 111245494 A 6/2020
(Continued)

OTHER PUBLICATIONS

International Search Report and Written Opinion from corresponding International Application No. PCT/EP2021/067218, mailed on Sep. 29, 2021, 14 pages.
(Continued)

*Primary Examiner* — Sung S Ahn
(74) *Attorney, Agent, or Firm* — Tucker Ellis LLP (57) ABSTRACT A method is proposed for operating a re-configurable reflective device, RRD, the RRD being re-configurable to provide multiple spatial filters, each one of the multiple spatial filters being associated with a respective input spatial direction from which incident signals on a data radio channel are accepted and with a respective output spatial direction into which the incident signals are reflected by the RRD. The method comprises: receiving, by the RRD from a first communication node, CN1, on a positioning radio channel different from the data radio channel, a CN1 reference signal, determining, by the RRD, an estimated CN1 angle of arrival of the CN1 reference signal, and reconfiguring the RRD based on the estimated CN1 angle of arrival.

20 Claims, 7 Drawing Sheets

(56) References Cited

U.S. PATENT DOCUMENTS

| | | | |
|---|---|---|---|
| 2013/0082867 A1* | 4/2013 | Malaga | H04B 1/1081 |
| | | | 342/40 |
| 2016/0119910 A1 | 4/2016 | Krzymien | |
| 2019/0053321 A1 | 2/2019 | Islam | |
| 2022/0231753 A1* | 7/2022 | Bengtsson | H04B 7/088 |

FOREIGN PATENT DOCUMENTS

| | | |
|---|---|---|
| EP | 3285407 A1 | 2/2018 |
| WO | 2020254031 A1 | 12/2020 |

OTHER PUBLICATIONS

Ying, Keke et al., "GMD-Based Hybrid Beamforming for Large Reconfigurable Millimeter-Wave Massive MIMO", IEEE, Jan. 20, 2020, 10 pages.

Office Action and Search Report from corresponding Swedish Application No. 2030213-9; mailed on Apr. 14, 2021, 11 pages.

Qingqing Wu and Rui Zhang, "Intelligent Reflecting Surface Enhanced Wireless Network: Joint Active and Passive Beamforming Design", IEEE; Dec. 9-13, 2018, 6 pages.

Abdelrahman Taha et al., "Enabling Large Intelligent Surfaces with Compressive Sensing and Deep Learning" arXiv:1904.10136v1, Apr. 23, 2019, 34 pages.

Qingqing Wu and Rui Zhang, "Beamforming Optimization for Wireless Network Aided by Intelligent Reflecting Surface with Discrete Phase Shifts", IEEE Transactions on Communications, vol. 68, No. 3, Mar. 2020, 14 pages.

Qingqing Wu and Rui Zhang, "Towards Smart and Reconfigurable Environment: Intelligent Reflecting Surface Aided Wireless Network", IEEE, Jan. 2020, 7 pages.

Henk Wymeersch et al., "Radio Localization and Mapping with Reconfigurable Intelligent Surfaces", implearXiv:1912.09401v2, Jun. 11, 2020, 9 pages.

Minchae Jung et al., "Asymptotic Optimality of Reconfigurable Intelligent Surfaces: Passive Beamforming and Achievable Rate", IEEE, Jun. 2020, 6 pages.

Sha Hu et al., "Beyond Massive-MIMO: The Potential of Data-Transmission with Large Intelligent Surfaces", arXiv:1707.02887v1, Jul. 10, 2017, 30 pages.

* cited by examiner

ANGLE-OF-ARRIVAL DEPENDENT RE-CONFIGURABLE REFLECTIVE DEVICES

TECHNICAL FIELD

Various examples generally relate to communicating between nodes using re-configurable reflective devices. Various examples specifically relate to repeatedly transmitting reference signals towards the re-configurable reflective devices.

BACKGROUND

In order to increase a coverage area for wireless communication, it is envisioned to use re-configurable reflective devices (RRD), sometimes also referred to as reflecting large intelligent surface (LIS). See, e.g., Sha Hu, Fredrik Rusek, and Ove Edfors. "Beyond massive MIMO: The potential of data transmission with large intelligent surfaces." *IEEE Transactions on Signal Processing* 66.10 (2018): 2746-2758.

An RRD can be implemented by an array of antennas that can reflect incident electromagnetic waves/signals. The array of antennas can be semi-passive. Semi-passive can correspond to a scenario in which the antennas do not provide signal amplification, but can impose a variable phase shift. An input spatial direction from which incident signals on a data radio channel are accepted and an output spatial direction into which the incident signals are reflected can be re-configured, by changing a phase relationship between the antennas.

SUMMARY

Accordingly, there is a need of improved techniques for re-configuring RRDs.

This need is met by the features of the independent claims. The features of the dependent claims define examples.

A method is proposed for operating a re-configurable reflective device, RRD, the RRD being re-configurable to provide multiple spatial filters, each one of the multiple spatial filters being associated with a respective input spatial direction from which incident signals on a data radio channel are accepted and with a respective output spatial direction into which the incident signals are reflected by the RRD. The method comprises: receiving, by the RRD from a first communication node, CN1, on a positioning radio channel different from the data radio channel, a CN1 reference signal, determining, by the RRD, an estimated CN1 angle of arrival of the CN1 reference signal, and re-configuring the RRD based on the estimated CN1 angle of arrival.

Further, a method is proposed for operating a CN1, wherein the CN1 is adapted for communicating with a CN2 on a data radio channel, the method comprising transmitting, by the CN1, on a positioning radio channel different from the data radio channel, a CN1 reference signal.

In addition, a method is proposed for operating an CN2, wherein the CN2 is adapted for communicating with a CN1 on a data radio channel, the method comprising transmitting, by the CN2, on a positioning radio channel different from the data radio channel, an AN reference signal.

Moreover, a re-configurable reflective device, RRD, is proposed wherein the RRD is re-configurable to provide multiple spatial filters, wherein each one of the multiple spatial filters is associated with a respective input spatial direction from which incident signals on a data radio channel are accepted and with a respective output spatial direction into which the incident signals are reflected by the RRD, wherein the RRD comprises control circuitry causing the RRD to receive, from a first communication node, CN1, on a positioning radio channel different from the data radio channel, a CN1 reference signal, determine an estimated CN1 angle of arrival of the CN1 reference signal, re-configure the RRD based on the estimated UE angle of arrival.

Further, a first communication node, CN1, is proposed, in particular a wireless communication device, UE, wherein the CN1 is adapted for communicating with a second communication node, CN2, in particular an access node, AN, on a data radio channel, wherein the CN1 comprises control circuitry causing the CN1 to transmit, on a positioning radio channel different from the data radio channel, a CN1 reference signal.

In addition, a second communication node, CN2, is proposed, in particular an access node, AN, wherein the CN2 is adapted for communicating with a first communication node, CN1, in particular a wireless communication device, UE, on a data radio channel, wherein the CN2 comprises control circuitry causing the CN2 to transmit, on a positioning radio channel different from the data radio channel, a CN2 reference signal. Moreover, it is proposed a communication system comprising an RRD, a CN1, and a CN2.

It is to be understood that the features mentioned above and those yet to be explained below may be used not only in the respective combinations indicated, but also in other combinations or in isolation without departing from the scope of the invention.

DETAILED DESCRIPTION

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Techniques are described that facilitate wireless communication between nodes. A wireless communication system includes a transmitter node and one or more receiver nodes. In some examples, the wireless communication system can be implemented by a wireless communication network, e.g., a radio-access network (RAN) of a Third Generation Partnership Project (3GPP)-specified cellular network (NW). In such case, the transmitter node can be implemented by a base station (BS) of the RAN, and the one or more receiver nodes can be implemented by terminals (also referred to as user equipment, UE). It would also be possible that the transmitter node is implemented by a UE and the one or more receiver nodes are implemented by a BS and/or further UEs. Hereinafter, for sake of simplicity, various examples will be described with respect to an example implementation of the transmitter node by a BS and the one or more receiver node by UEs—i.e., to downlink (DL) communication; but the respective techniques can be applied to other scenarios, e.g., uplink (UL) communication and/or sidelink communication.

According to various examples, the transmitter node can communicate with at least one of the receiver nodes via an RRD.

The RRD may include an antenna array. The RRD may include a meta-material surface. In examples, an RRD may include a reflective antenna array (RAA).

There are many school-of-thoughts for how RRDs should be integrated into 3GPP-standardized RANs.

In an exemplary case, the NW operator has deployed the RRDs and is therefore in full control of the RRD operations.

The UEs, on the other hand, may not be aware of the presence of any RRD, at least initially, i.e., it is transparent to a UE whether it communicates directly with the BS or via an RRD. The RRD essentially functions as a coverage-extender of the BS. The BS may have established a control link with the RRD.

According to another exemplary case, it might be a private user or some public entity that deploys the RRD. Further, it may be that the UE, in this case, controls RRD operations. The BS, on the other hand, may not be aware of the presence of any RRD and, moreover, may not have control over it/them whatsoever. The UE may gain awareness of the presence of RRD by means of some short-range radio technology, such as Bluetooth, wherein Bluetooth may refer to a standard according to IEEE 802.15, or WiFi, wherein WiFi may refer to a standard according to IEEE 802.11, by virtue of which it may establish the control link with the RRD.

In a further exemplary case, neither the UE nor the BS are aware of the presence of the RRD. The RRD may be transparent with respect to a communication between the UE and the BS on a data radio channel. The RRD may gain awareness of the UE and/or the BS and re-configure itself based on information obtained from the UE and/or BS.

The three exemplary cases described above are summarized in TAB. 1 below.

TABLE 1

Scenarios for RRD integration into cellular NW

| Scenario | Description | Explanation |
|---|---|---|
| A | BS-RRD control link | BS controls the RRD and/or can obtain information from the RRD. A control link is established between the BS and the RRD. |
| B | UE-RRD control link | UE controls the RRD and/or can obtain information from the RRD. A control link is established between the UE and the RRD. |
| C | transparent RRD | RRD re-configures itself based on information obtained from the UE and/or BS. No control link is established between the RRD and the UE or the BS. |

Hereinafter, techniques will be described which facilitate communication between a transmitter node—e.g., a BS—and one or more receiver nodes—e.g., one or more UEs—using an RRD.

Figure 1:
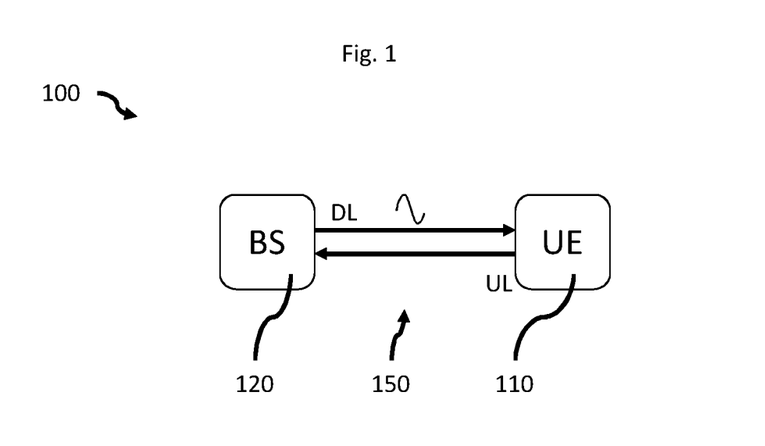
FIG. 1 schematically illustrates a communication system according to various examples.

FIG. 1 schematically illustrates a communication system 100. The communication system 100 includes two nodes 110, 120 that are configured to communicate with each other via a data radio channel 150. In the example of FIG. 1, the node 120 is implemented by an access node (AN), more specifically a BS, and the node 110 is implemented by a UE. The BS 120 can be part of a cellular NW (not shown in FIG. 1).

As a general rule, the techniques described herein could be used for various types of communication systems, e.g., also for peer-to-peer communication, etc. For sake of simplicity, however, hereinafter, various techniques will be described in the context of a communication system that is implemented by a BS 120 of a cellular NW and a UE 110.

As illustrated in FIG. 1, there can be DL communication, as well as UL communication. Examples described herein particularly focus on the DL communication, but similar techniques may be applied to UL communication. Input sweep and receive beam sweep may relate to DL communication and output sweep and transmit beam sweep may relate to UL communication.

Figure 2:
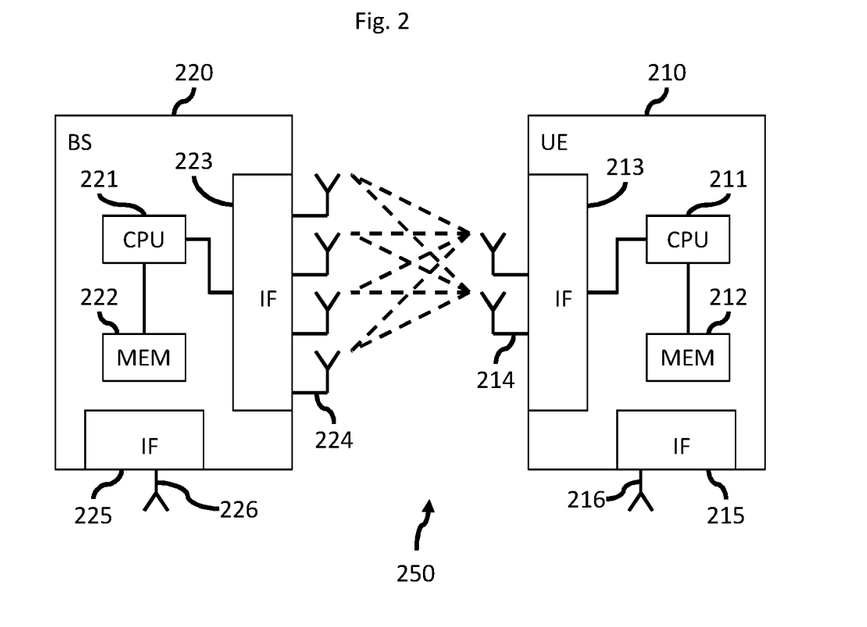
FIG. 2 schematically illustrates details of the communication system according to the example of FIG. 1.

FIG. 2 illustrates details with respect to the BS 220. The BS 220 includes control circuitry that is implemented by a processor 221 and a non-volatile memory 222. The processor 221 can load program code that is stored in the memory 222. The processor 221 can then execute the program code. Executing the program code causes the processor to perform techniques as described herein.

Moreover, FIG. 2 illustrates details with respect to the UE 210. The UE 210 includes control circuitry that is implemented by a processor 211 and a non-volatile memory 212. The processor 211 can load program code that is stored in the memory 212. The processor can execute the program code. Executing the program code causes the processor to perform techniques as described herein.

Further, FIG. 2 illustrates details with respect to communication between the BS 220 and the UE 210 on the data radio channel 250. The BS 220 includes an interface 223 that can access and control multiple antennas 224. Likewise, the UE 210 includes an interface 213 that can access and control multiple antennas 214.

The UE 210 comprises a further interface 215 that can access and control at least one antenna 216 to transmit or receive a signal on a positioning radio channel different from the data radio channel 250. Likewise, the BS 220 may comprise an additional interface 225 that can access and control at least one antenna 226 to transmit or receive a signal on the or a further positioning radio channel different from the data radio channel.

While the scenario of FIG. 2 illustrates the antennas 224, 226 being coupled to the BS 220, as a general rule, it would be possible to employ transmit-receive points (TRPs) that are spaced apart from the BS 220.

The interfaces 213, 223 can each include one or more TX chains and one or more receiver chains. For instance, such RX chains can include low noise amplifiers, analogue to digital converters, mixers, etc. Analogue and/or digital beamforming would be possible.

Thereby, phase-coherent transmitting and/or receiving (communicating) can be implemented across the multiple antennas 214, 224. Thereby, the BS 220 and the UE 210 can selectively transmit on multiple TX beams (beamforming), to thereby direct energy into distinct spatial directions.

By using a TX beam, the direction of the wavefront of signals transmitted by a transmitter of the communication system is controlled. Energy is focused into a respective direction or even multiple directions, by phase-coherent superposition of the individual signals originating from each antenna 214, 224. Thereby, the spatial data stream can be directed. The spatial data streams transmitted on multiple beams can be independent, resulting in spatial multiplexing multi-antenna transmission; or dependent on each other, e.g., redundant, resulting in diversity multi-input multi-output (MIMO) transmission.

As a general rule, alternatively or additionally to such TX beams, it is possible to employ receive (RX) beams.

Figure 3:
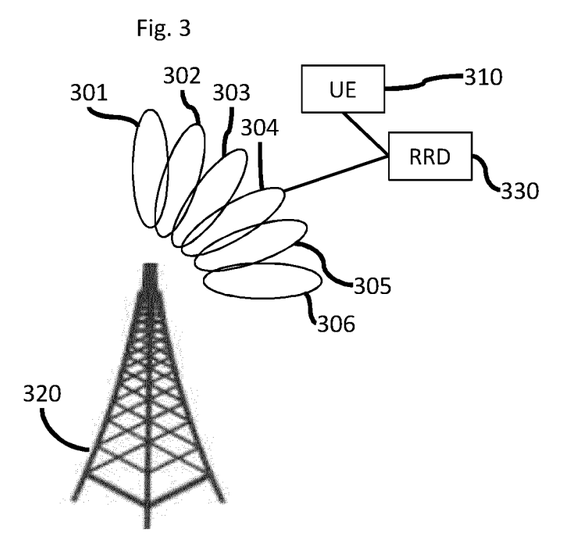
FIG. 3 schematically illustrates multiple downlink transmit beams used at a transmitter node of the communication system and further schematically illustrates an RRD towards which one of the multiple transmit beams is directed according to various examples.

FIG. 3 illustrates DL TX beams 301-306 used by the BS 320. Here, the BS 320 activates the beams 301-306 on different resources (e.g., different time-frequency resources, and/or using orthogonal codes/precoding) such that the UE 310 can monitor for respective signals transmitted on the DL TX beams 301-306.

It is possible that the BS 320 transmits signals to the UE 310 via a RRD 330. In the scenario of FIG. 3, the downlink transmit beam 304 is directed towards the RRD 330. Thus, whenever the BS 320 transmits signals to the UE 310 using the downlink transmit beam 304—e.g., a respective block of a burst transmission —, a spatial filter is provided by the RRD 330. The spatial filter is associated with a respective spatial direction into which the incident signals are then selectively reflected by the RRD 330. Details with respect to the RRD 330 are illustrated in connection with FIG. 4.

Figure 4:
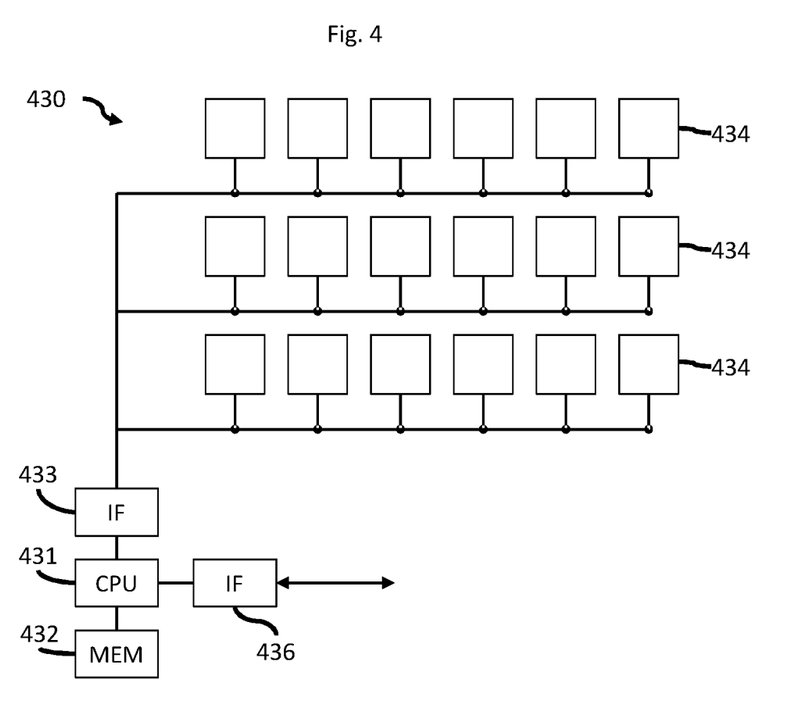
FIG. 4 schematically illustrates details with respect to the RRD.

FIG. 4 illustrates aspects in connection with the RRD 430. The RRD 430 includes a phased array of antennas 434 that impose a configurable phase shift when reflecting incident signals. This defines respective spatial filters that are associated with spatial directions into which the incident signals are reflected. The antennas 434 can be passive or semi-passive elements that do not provide any amplification. The RRD 430 thus provides coverage extension by reflection of radio-frequency (RF) signals. A translation to the baseband may not be required. This is different, to, e.g., decode-and-forward repeater or relay functionality.

The RRD 430 includes an antenna interface 433 which controls an array of antennas 434; a processor 431 can activate respective spatial filters one after another. The RRD 430 further includes an interface 436 for receiving and/or transmitting signals on a positioning radio channel 460. There is a memory 432 and the processor 431 can load program code from the non-volatile memory and execute the program code. Executing the program code causes the processor to perform techniques as described herein.

FIG. 4 is only one example implementation of the RRD. Other implementations are conceivable. For example, a meta-material surface not including distinct antenna elements may be used. The meta-material can have a configurable refraction index. To provide a re-configurable refraction index, the meta-material may be made of repetitive tunable structures that have extensions smaller than the wavelength of the incident RF signals.

Figure 5:
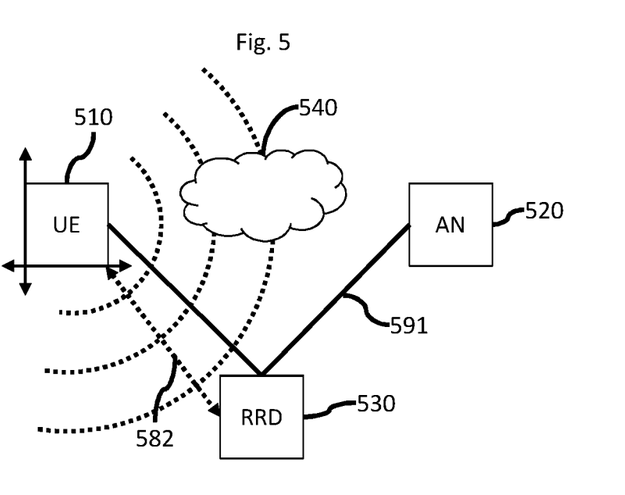
FIG. 5 schematically illustrates a scenario for using the RRD.

FIG. 5 illustrates an exemplary scenario C as described hereinbefore with reference to TAB. 1. A UE 510 is to communicate with an AN 520 over a data radio channel 591. The data radio channel may be a 5G NR channel, in particular a 5G NR channel in Frequency Range 2. An obstacle 540 between the UE 510 and the AN 520 may impede the communication between the UE 510 and the AN 520 on the data radio channel.

An RRD 530 may be employed to provide a supplemental physical transmission path for the communication over the data radio channel. The UE 510 and the AN 520 may be unaware of the presence of the RRD 530. In some examples, the position and orientation of the RRD 530 with respect to the AN 520 may be fixed and known to the RRD 530. As described hereinbefore, the RRD 530 may be semi-passive and free of circuitry to translate signals on a data radio channel to the baseband.

The RRD 530 may be configured for receiving a UE reference signal 582 on a positioning radio channel different from the UE 510 and for determining an estimated UE angle of arrival of the UE reference signal. The estimated UE angle of arrival may be indicative of the angular position of the UE 510 with respect to a reference point 531 of the RRD 530. The UE reference signal may be an omnidirectional signal. In some examples, the UE reference signal may be a beacon signal. As a general rule, a reference signal may have a predefined signal shape at the transmitter. Thereby, based on a comparison of the output signal shape with the predefined signal shape, characteristics of the channel can be inferred.

The data radio channel and the positioning radio channel may be offset in frequency. The positioning radio channel may be at least one of a Bluetooth radio channel, a WiFi channel, or an ultra-wideband radio channel. Methods for determining an angle of arrival may be provided by a communication protocol associated with the positioning radio channel. For example, methods for determining an angle of arrival may be provided by a Bluetooth radio channel.

The RRD 530 may provide multiple spatial filters, wherein each one of the multiple spatial filters is associated with a respective input spatial direction from which incident signals on a data radio channel are accepted and with a respective output spatial direction into which the incident signals are reflected by the RRD.

Based on the estimated UE angle of arrival, the RRD 530 may be re-configured. Re-configuring the RRD 530 may imply selecting a spatial filter such that the input spatial direction corresponds to the known position and orientation of the AN 520 and output spatial direction corresponds to the estimated UE angle of arrival.

In examples, re-configuring the RRD 530 comprises using a predefined codebook for setting a given output spatial direction of the RRD to correspond to the estimated UE angle of arrival. Using a predefined codebook for setting a given output spatial direction of the RRD 530 to correspond to the estimated UE angle of arrival may avoid calculations and therefore be faster and/or less energy consuming.

The predefined codebook may comprise multiple entries associated with different frequencies of the data radio channel for setting the given output spatial direction of the RRD to correspond to the estimated UE angle of arrival. For a given configuration of the RRD 530, different frequencies may result in different input spatial directions from which incident signals are accepted and output spatial directions into which the incident signals are received. Thus, using a predefined codebook which takes into account the frequencies of the data radio channel may allow for establishing a better communication of the UE with the AN over the data radio channel.

Re-configuring the RRD 530 may also comprise using a frequency of the data radio channel for calculating a configuration for setting a given output spatial direction of the RRD to correspond to the estimated UE angle of arrival. Calculating the configuration may reduce the need to provide specific memory for storing the predefined codebook.

It is also possible to use a calculation in combination with a predefined codebook. For example, the configuration for more common frequencies may be derived from the predefined codebook and the configuration for less common frequencies may be calculated.

Figure 6:
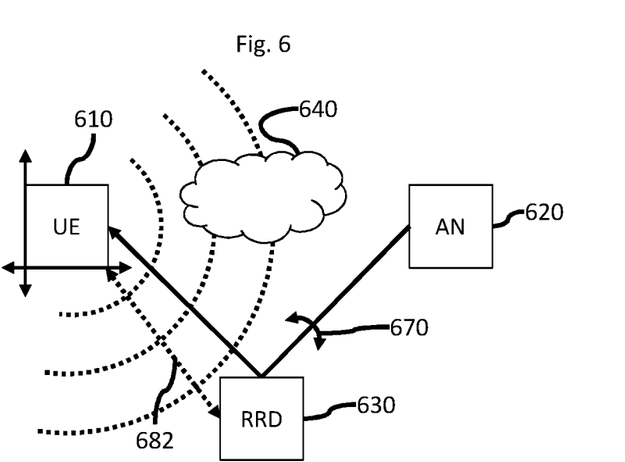
FIG. 6 schematically illustrates another scenario for using the RRD.

FIG. 6 illustrates a further scenario C similar to the scenario described with respect to FIG. 5, in which the position and orientation of the RRD 630 with respect to the AN 620 is also fixed but in contrast to the scenario of FIG. 5 not known to the RRD 630. Direct communication between the UE 610 and the AN 620 may again be blocked by an obstacle 640.

As described hereinbefore, the RRD 630 may determine an estimated UE angle of arrival based on the UE reference signal 682 and set a given output spatial direction of the RRD 630 to correspond to the estimated UE angle of arrival. The RRD 630 may then perform an input sweep 670 comprising changing the input spatial direction while using the given output spatial direction. In particular, the input sweep 670 may be performed over signals transmitted by the AN 620. For example, the RRD 630 can toggle through different input spatial directions by changing the phase relationships between the antenna elements.

A timing of the input sweep may be synchronized with a receive beam sweep of the UE. The UE may perform a receive beam sweep to detect signals on the data radio channel. The UE may receive the signals on the data radio channel either directly from the AN 620 or via random or intended reflections. The UE may perform a receive beam sweep to find a suitable configuration for receiving the signal on the data radio channel.

The timing of the input sweep may be synchronized with the timing of the receive beam sweep based on a predefined reference timing of the receive beam sweep in accordance with a communication protocol associated with the data radio channel. The communication protocol may define a time base. The time base may be associated with transmission frames having a defined beginning, end, and length.

Alternatively, control signaling between the RRD and the UE may exist for synchronizing the timing of the input sweep with the timing of the receive beam sweep. As explained above, the RRD may be free of circuitry for translation of RF signals in the data radio channel to the baseband. However, the RRD may comprise circuitry for establishing control communication in a different radio channel. Said radio channel may be less adapted for transmitting data at a high bandwidth but sufficient for control communication. Moreover, the circuitry required for establishing communication over said radio channel may allow for using cheaper components. Further, power consumption of the components required for said radio channel may be reduced compared to components required for the data radio channel. In examples, the RRD may comprise circuitry for establishing control communication in the positioning radio channel. More particularly, the RRF may comprise circuitry for establishing control signaling using a Bluetooth or WiFi connection.

The RRD may receive at least one signal indicative of a detection of a reflected incident signal during the input sweep from the UE. The signal indicative of a detection of a reflected incident signal during the input sweep may be received in particular on the positioning radio channel. However, in some implementations, the signal indicative of a detection of a reflected incident signal during the input sweep may also be received in a radio channel which is different from both the data radio channel and the positioning radio channel. In examples, more than one signal indicative of a detection of a reflected incident signal during the input sweep may be received from the UE. For example, a signal emitted by the AN may reach the RRD via different spatial paths. Thus, for each of said different spatial paths, the UE may detect a reflected incident signal during the input sweep and transmit respective signals indicative of a detection of a reflected incident signal during the input sweep.

According to examples, a given input spatial direction may be selected based on the signal indicative of a detection of a reflected incident signal received from the UE. If more than one signal indicative of a detection of a reflected incident signal is received from the UE, further criteria may be evaluated for selecting the given input spatial direction. For example, the signals indicative of a detection of a reflected incident signal may provide information on the reception quality, which may be evaluated for selecting the given input spatial direction. Once the given input spatial direction has been selected, communicating on the data radio channel may commence.

Figure 7:
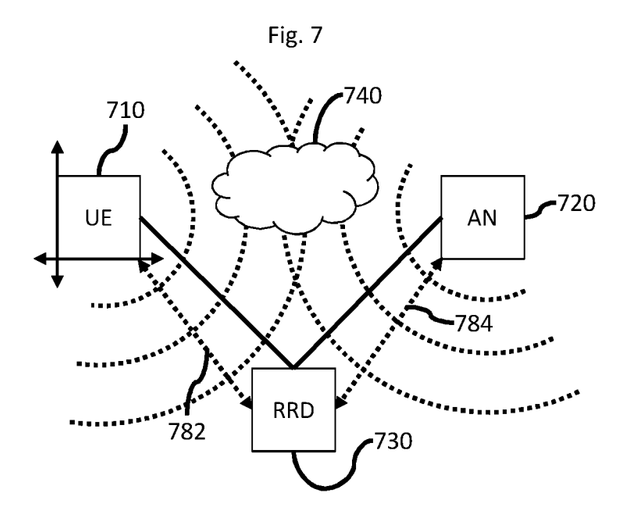
FIG. 7 schematically illustrates a further scenario for using the RRD.

FIG. 7 illustrates another scenario C, in which the AN 720 may be but is not necessarily mobile with respect to the RRD 730. As has been described hereinbefore, the RRD 730 may receive a UE reference signal 782, determine an estimated UE angle of arrival and set a given output spatial direction of the RRD 730 to correspond to the estimated UE angle of arrival.

The RRD may receive an AN reference signal 784 from the AN 720 on a positioning radio channel different from the data radio channel. The positioning radio channel may be the same radio channel, on which the UE reference signal is received from the UE 710. Alternatively, a further positioning radio channel may be used. The RRD 730 may determine an estimated angle of arrival of the AN reference signal and re-configure the RRD further based on the estimated AN angle of arrival. Further re-configuration may refer to re-configuring the RRD based on the estimated UE angle of arrival and based on the estimated AN angle of arrival.

Re-configuring the RRD 730 further based on the estimated AN angle of arrival may imply selecting a spatial filter such that the input spatial direction corresponds to the estimated AN angle of arrival.

In examples, re-configuring the RRD 730 comprises using a predefined codebook for setting a given input spatial direction of the RRD to correspond to the estimated AN angle of arrival. Using a predefined codebook for setting a given input spatial direction of the RRD 730 to correspond to the estimated AN angle of arrival may avoid calculations and therefore be faster and/or less energy consuming.

The predefined codebook may comprise multiple entries associated with different frequencies of the data radio channel for setting the given input spatial direction of the RRD to correspond to the estimated AN angle of arrival. For a given configuration of the RRD 730, different frequencies may result in different input spatial directions from which incident signals are accepted and output spatial directions into which the incident signals are received. Thus, using a predefined codebook which takes into account the frequencies of the data radio channel may allow for establishing a better communication of the UE with the AN over the data radio channel.

Re-configuring the RRD 730 may also comprise using a frequency of the data radio channel for calculating a configuration for setting a given input spatial direction of the RRD 730 to correspond to the estimated AN angle of arrival. Calculating the configuration may reduce the need to provide specific memory for storing the predefined codebook.

It is also possible to use a calculation in combination with a predefined codebook. For example, the configuration for more common frequencies may be derived from the predefined codebook and the configuration for less common frequencies may be calculated.

Examples may prescribe requesting the AN to transmit the AN reference signal and/or requesting the UE to transmit the UE reference signal. In other examples, the AN reference signal and/or the UE reference signal may be a signal that is or may be emitted by the UE and/or the AN without a specific request. For example, the AN reference signal and/or the UE reference signal may be a Bluetooth signal, with which surrounding Bluetooth devices are periodically informed of the presence of the AN and/or the UE.

There are multiple conceivable ways for requesting the AN and/or the UE to transmit the AN reference signal/UE reference signal. In an example, the RRD may transmit a request for the UE reference signal on the positioning data channel. Further, the UE may communicate with the NW, in particular over the data radio channel, and then receive the request for transmitting the UE reference signal from the NW. For example, a user employing the RRD may register the RRD on a web server, the NW may search for registered RRDs and send the request to transmit the UE reference signal to UEs in geographical vicinity of the RRDs. Accordingly, the RRD may transmit a request for the AN reference signal on the positioning data channel. Moreover, the AN may receive the request for transmitting the AN reference signal from the NW it is connected to via a wireless or wired connection.

Figure 8:
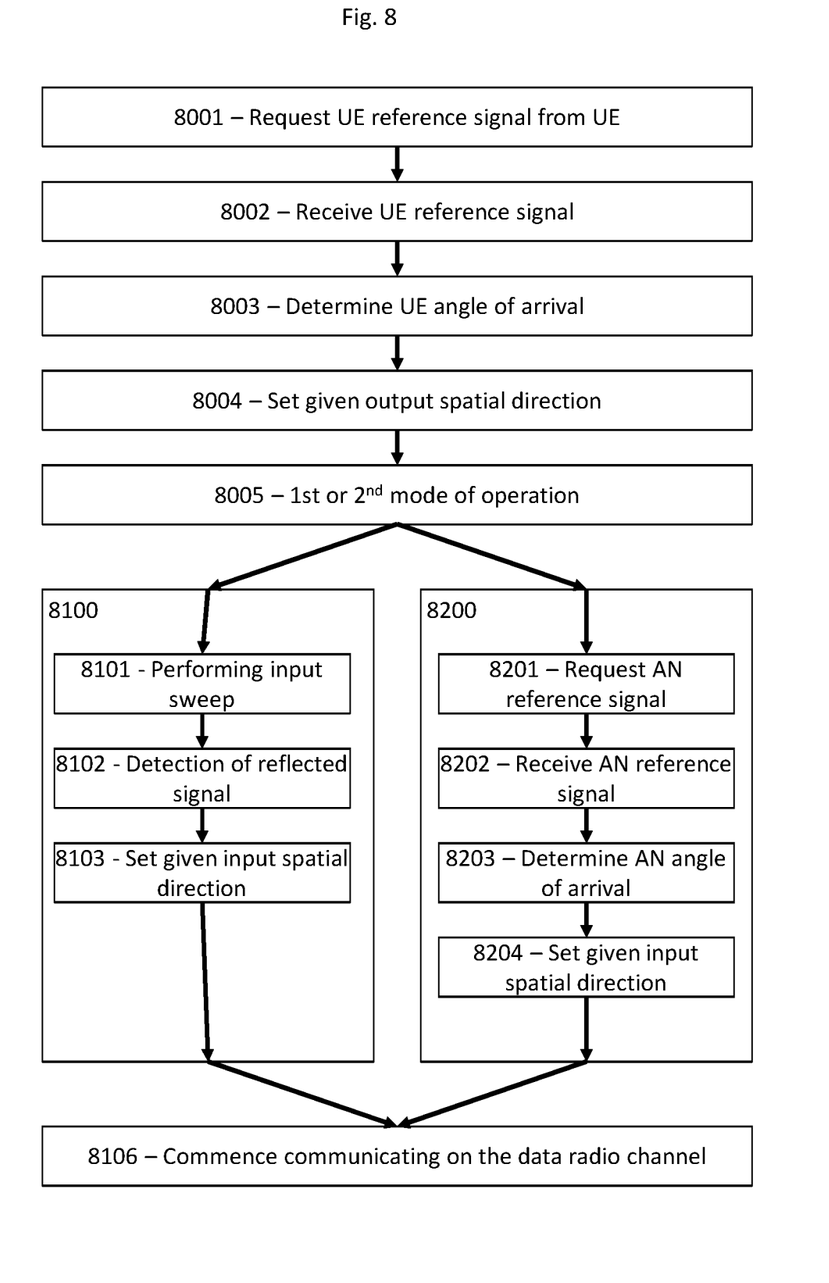
FIG. 8 schematically illustrates a method for operating an RRD.

FIG. 8 illustrates a method for operating an RRD, wherein the RRD is re-configurable to provide multiple spatial filters, wherein each one of the multiple spatial filters is associated with a respective input spatial direction from which an incident signal on a data radio channel is accepted and with a respective output spatial direction into which the incident signal is reflected by the RRD. In optional step 8001, the UE may receive request for transmitting a UE reference signal over the positioning radio channel.

The RRD receives the UE reference signal on a positioning radio channel different from the data radio channel (step 8002) and determines an estimated UE angle of arrival of the UE reference signal (step 8003). In step 8004, re-configuring of the RRD may take place, in which a given output spatial direction may be set to correspond to the UE angle of arrival. This may imply using a codebook and/or a calculation. A frequency of the data radio channel may be taken into account for the re-configuration.

In step 8005, a first mode of operation or a second mode of operation may be selected. The selecting may be based on a relative mobility of the AN with respect to the RRD. For example, signals exchanged between the AN and the RRD on the positioning radio channel may be analyzed with respect to possible Doppler shifts and/or Doppler spreading.

In the first mode of operation 8100, the RRD may perform an input sweep comprising changing the input spatial direction while using the given output spatial direction (step 8101). A timing of the input sweep may be synchronized with a timing of a receive beam sweep of the UE. The input sweep is performed on the data radio channel.

During the input sweep, the RRD may receive at least one signal indicative of a detection, by the UE, of a reflected incident signal during the input sweep (step 8102). In step 8103, a given input spatial direction may be selected based on the signal indicative of the detection of a reflected incident signal received from the UE.

Once a given input spatial direction has been selected, communication on the data radio channel may start (step 8106).

In the second mode of operation 8200, optionally, transmitting an AN reference signal may be requested from the AN (optional step 8201). In step 8202, the RRD may receive a or the AN reference signal from the AN on the or a further positioning radio channel. The RRD may then determine an estimated AN angle of arrival of the AN reference signal (step 8203).

In step 8204, the RRD may be re-configured by setting a given input spatial direction of the RRD to correspond to the estimated AN angle of arrival. Heretofore, a predefined codebook and/or a calculation may be used. Afterwards, communication on the data radio channel may start (step 8106).

As explained hereinbefore, the selection of the first mode of operation 8100 or the second mode of operation 8200 may be made based on a mobility level of the AN with respect to the RRD.

In case the position of the AN with respect to the RRD changes, i.e. the AN moves, the RRD moves or both the AN and RRD move, it may be required to re-configure the RRD to adapt the incident angle. Using the second mode of operation may allow for a faster re-configuration of the RRD upon changing relative positions. The first mode of operation, may avoid any active communication between the AN and the RRD. In particular, the RRD may be free of any circuitry for transmitting a reference signal on a positioning radio channel.

In examples, one of the aforementioned methods for re-configuring the RRD may prescribe repetitively monitoring for the UE reference signal and repeating the determining the estimated UE angle of arrival of the UE reference signal and the re-configuring of the RRD based on the estimate UE angle of arrival while communicating on the data radio channel. The given output spatial angle may be continuously adapted to a changing position of the UE with respect to the RRD. In examples, the repeating of the determining of the estimated UE angle of arrival is performed without synchronization to transmission intervals— e.g., transmission frames—of a communication protocol of the data radio channel. The re-configuration of the RRD may thus be transparent with respect to the communication between the AN and the UE over the data radio channel. Correspondingly, the RRD may repetitively monitor for the AN reference signal. This may simplify operation; such techniques are based on the finding that re-configuring the RRD can occur comparably slowly, e.g., slower than the length of a transmission frame of the communication protocol. Then, from the perspective of the data radio channel, the channel behavior is static or only slowly changing, even though the RRD is re-configured.

In examples, determining an estimated UE angle of arrival of the UE reference signal comprises determining one or more candidate UE angle of arrivals of the UE reference signal, and selecting one of the one or more candidate UE angles of arrival as estimated UE angle of arrival. There may be scenarios, in which the UE reference signal does not (only) reach the RRD via the direct line of sight but via one or more reflections. In such situations, the RRD may determine more than one candidate UE angle of arrival and select one of the more than one candidate UE angles of arrival to become the estimated UE angle of arrival. In some example, selecting the estimated UE angle of arrival may be made based on the respective signal strength of the UE reference signal received via the one or more candidate UE angles of arrival. According to examples, the RRD may select a different one of the one or more candidate UE angles of arrival as estimated UE angle of arrival in response to receiving a trigger signal from the UE.

Figure 9:
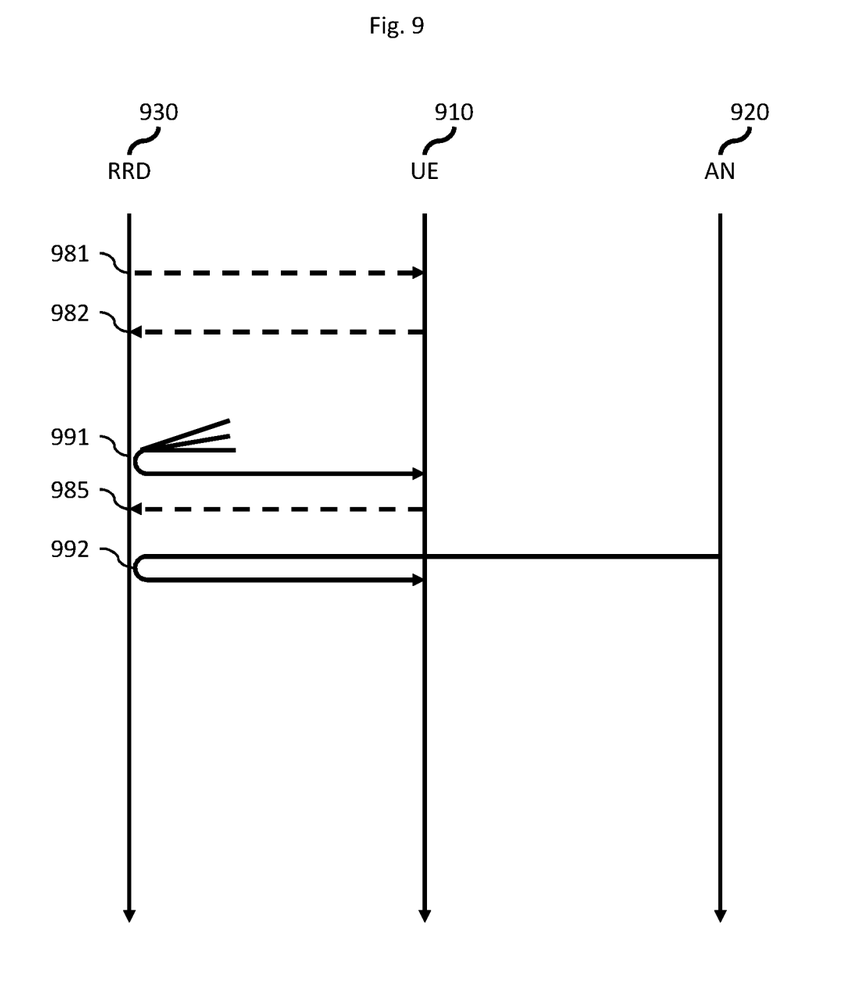
FIG. 9 schematically illustrates a signaling diagram.

FIG. 9 shows a signaling diagram according to an example. Optionally, the RRD 930 may send a signal 981 to the UE 910 requesting the UE 910 to transmit a UE reference signal. The signal 981 may be sent over a positioning radio channel as indicated with dashed lines. The UE 910 may transmit a UE reference signal 982. The UE reference signal 982 may be a broadcast signal not directed to any particular receiver. The UE reference signal 982 may in particular be an omnidirectional signal 982. A UE reference signal 982 may be but is not necessarily sent in response to the signal 981. For example, the UE reference signal 982 may be sent at periodic intervals. The RRD 930 may receive the UE reference signal 982 and determine an estimated UE angle of arrival of the UE reference signal 982. The RRD 930 may set a given output spatial direction 991 of the RRD 930 for the data radio channel (indicated with a solid line) to correspond to the estimated UE angle of arrival, which has been determined by the UE reference signal 982, and perform an input sweep comprising changing the input spatial direction while using the given output spatial direction. The estimated UE angle of arrival may denote the estimated angle of arrival of the UE reference signal 982.

The UE 910 may transmit on the positioning radio channel a signal 985 indicative of a detection of a reflected incident signal during the input sweep. The RRD 930 may then set a given input spatial direction based on the signal 985 and the UE 910 may communicate with the AN 920 using signals 992 on a data radio channel reflected by the RRD 930.

Figure 10:
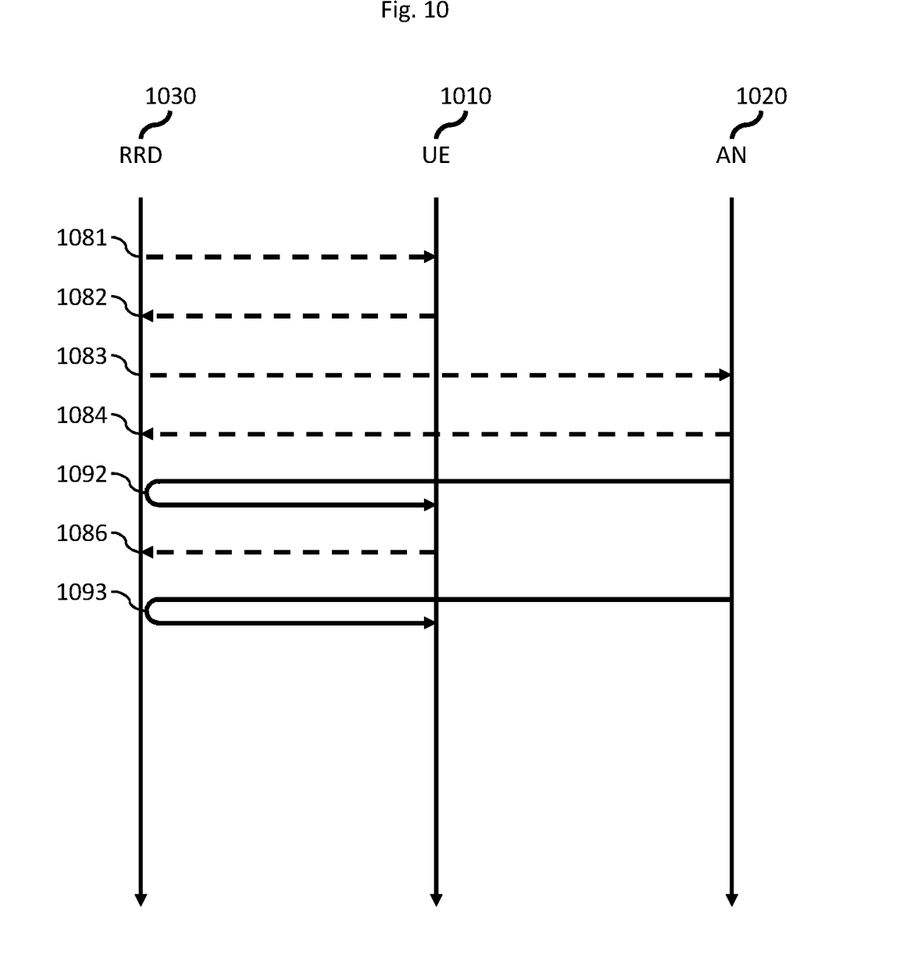
FIG. 10 schematically illustrates a further signaling diagram.

FIG. 10 shows a signaling diagram according to another example. Signals indicated with dashed lines, i.e., signals 1081, 1082, 1083, 1084 are exchanged in at least one positioning radio channel, whereas signals indicated with solid lines, i.e. signals 1092, 1093 are exchanged in a data radio channel.

As explained hereinbefore, the RRD 1030 may optionally send a signal 1081 to the UE 1010 requesting the UE 1010 to transmit a reference signal. The RRD 1030 may receive a UE reference signal 1082 transmitted by the UE 1010 on a positioning radio channel (depicted with dashed lines) and determine an estimated UE angle of arrival. Further, the RRD 1030 may optionally send a signal 1083 to the AN 1020 requesting the AN 1020 to transmit an AN reference signal. The RRD 1030 may receive an AN reference signal 1084 transmitted by the AN 1020 and determine an estimated AN angle of arrival. The RRD 1030 may set a given output spatial direction and a given input spatial direction to correspond to the estimated UE angle of arrival and the estimated AN angle of arrival respectively. Afterwards communication between the UE 910 and the AN 920 may commence using signals 1092 on a data radio channel reflected by the RRD 1030. As explained hereinbefore, the estimated UE angle of arrival may be selected from more than one candidate UE angles of arrival. The RRD 1030 may receive a trigger signal 1086 from the UE 1010 triggering the RRD to select a different one of the one or more candidate UE angles of arrival than the currently selected candidate UE angle of arrival. The RRD 1030 may then be reconfigured such that the given output spatial direction corresponds to the different candidate UE angle of arrival. Then, communication between the UE 910 and the AN 920 may continue or re-commence using signals 1093 on a data radio channel reflected by the RRD 1030 with its new configuration. According to examples, the trigger signal 1086 may also be transmitted from the AN 1020. This may be advantageous when a user moves the AN to a new position or when the selected AN-RRD path gets blocked.

Although the disclosure has been shown and described with respect to certain preferred examples, equivalents and modifications will occur to others skilled in the art upon the reading and understanding of the specification. The present disclosure includes all such equivalents and modifications and is limited only by the scope of the appended claims.

For illustration, while various scenarios have been illustrated in the context of a DL transmission from a BS 320 to a UE 310 using the RRD 330, similar techniques can be applied for, e.g., transmissions between two mobile devices, e.g., to UEs on a sidelink or generally using device-to-device (D2D) communication. In particular for scenarios in which the transmitter node moves relatively with respect to the RRD, the spatial direction into which incident signals are selectively reflected by the RRD depends on the respective spatial filter provided by the RRD, but also depends on the spatial direction with which the incident signals arrive at the RRD (wherein this direction depends on the relative movement of the transmitter node with respect to the RRD).

For further illustration, above, various scenarios have been described in which the spatial filter provided by the RRD is associated with a respective spatial direction into which the incident signals are reflected. It is, as a general rule, possible, that the spatial filter is designed to provide a reflection into a single spatial direction or multiple spatial directions.

For further illustration, well above various scenarios have been described with an implementation of the RRD using an antenna array, similar techniques may be readily applied to other kinds and types of surfaces having a re-configurable refractive index.

As explained, RRDs or LIS (large intelligent surface) reflectors are foreseen to be an essential part of mm-wave communication systems to combat large propagation loss and blocking.

A large challenge with reflecting LISs may be to manage beam forming when one beam needs to be directed toward a base station (BS) or access point (AP) or more generally access node (AN) and at the same time another beam needs to be directed toward a UE. For a reflective LIS the problem is therefore two-fold as the intention is to coherently combine signals received over an area (create a first beam) and reflect them toward a receiver (a second beam).

To have a low cost and low energy design, a re-configurable reflecting surface is addressed in this disclosure. Generally, such LIS needs to be controlled. Depending on the ownership situation (landlord or operator owned) the control approach may differ. If the LIS is owned by an operator it can be assumed that the access node controls the LIS beams toward the UE as an extension of the BS. However, for the private use cases it may be foreseen that a person wants to improve the coverage at home by simply buying a LIS without registering it to the network, i.e. transparently.

Based on the assumption that the LIS may be installed in a fixed position (non-mobile) the beam toward the access node becomes static and the remaining challenge in such case (after installation) relates to the beam management toward the UE, which is assumed mobile.

However, the disclosure also relates or can be extended to scenarios when either the access point or the LIS are mobile. The idea is to use angle of arrival (AoA) detection, for example AoA detection provided by Bluetooth 5.1, to estimate a direction and use that direction by associating it with an entry of a codebook for the communication frequency, in particular a communication frequency of the data radio channel. For each AoA there may be an entry in the codebook that directs the LIS reflected beam in the UE-LIS interface to the same direction.

In situations where the LIS and/or the access point are mobile, similarly, a Bluetooth (BT) link, or in general an ancillary, positioning link, may be needed between the access point and the LIS. Based on both angles the estimate toward the access point and toward the UE, settings to control the reflection angle (i.e. reflection index) can be computed or obtained from a codebook.

This may result in the following, proposed methods for installation and operation:

A) In a first situation, both the LIS and the access point are assumed to be stationary, so that there is no relative mobility between them. Preferably, but not necessary, there is a line of sight (LOS) path, free of obstacles, between the access node and the LIS.

(1) The user connects the UE to the LIS, e.g., via BT. A program in the UE activates the mm-wave receiver in the UE which starts Rx-scanning for a beam reflected by the LIS but transmitted from the access node. During this process the LIS uses BT-AoA detection to keep one beam fixed toward the UE while it systematically sweeps another beam toward the access node. When the UE detects a mm-wave signal it notifies the LIS via BT. The sweep rate in the LIS may be required to be different from the sweep rate in the UE. Otherwise there may be a risk that it takes very long time to find the (wanted) occasion when the LIS-access node and the LIS-UE beam pairs co-exist.

(2) The LIS can now be assumed aware of the beam direction toward the access node and may enter operational mode (communicated by the UE to the LIS over the BT link). During the operational mode the LIS keeps the beam toward the access node fixed while it directs the beam toward the UE, based on the BT-AoA estimation.

(3) From a UE perspective, it is only required to transmit a beacon signal (e.g., over BT) while using the mm-wave communication.

B) In a second situation, there may be mobility both between the access point and the LIS; and between the UE and the LIS.

(1) Both the access node and the UE establish a BT connection with the LIS.

(2) Based on the estimated AoAs the LIS obtains the reflection coefficient for the mm-wave signal either by computing or from a codebook.

(3) From a mm-wave communication perspective, both nodes need to transmit a beacon signal (e.g., over BT) during the mm-wave communication.

There is no need for a modification of the mm-wave communication protocol. The UE may simply scan for a beam and use the strongest candidate it finds. If it is via the LIS it uses the LIS, otherwise the UE communicates directly with the access point. This means that a LIS reflected signal is only used when it is the strongest available beam. The LIS blindly configures the reflection angle between the access mode and the UE.

In the case the access node and the LIS are stationary, the access node does not need to be made aware of the LIS presence.

There may be a dependency between the beam between the access node and the LIS and the beam between the LIS and the UE. Each precoder vector may be associated with reflection properties of the LIS. However, the beams may be separated and the precoder needed to reflect signals from any point to any other point may be derived. If one point is fix, it is possible to derive a codebook with beams to cover an area.

It can be assumed that the LIS beam management is a slow process where a beam update is non disruptive. Non disruptive means that incremental beam adjustments can be made unsynchronized to the mm-wave communication.

In a further situation, the UE or access point may configure the LIS to identify redundant reflection coefficients for communication. The line-of-sight (LOS) channel between the LIS and the access-node may be obstructed. Penetration, loss or more general path-loss, may be different for the BT signal and the mm-wave signal. However, the reflection angles will in most scenarios be the same.

The proposed approach enables LIS to operate without any influence to the mm-communication standard.

According to known approaches, the positions of the LIS and the access node are static and the relative positions need to be known by the system. The BT positioning of the UE is then determined by the access node and shared with the LIS over a communication channel. Based on this the LIS derives the reflection coefficient for the mm-wave communication. This may have the following shortcomings:
1. It does not cover the cases when the LIS and/or the access point are mobile. In fact such system needs to be re-initiated/set-up for each such event.
2. Awareness of presence of the LIS at both nodes (UE and AN) is mandatory. According to the approach proposed in this disclosure, a least the access node does not need to be aware of the presence of the LIS.
3. A technical effect, where the prior art totally fails, is from the fact that the prior art uses the relative position of/direction to the UE to determine the communication angles. This will always direct the LIS toward the LOS direction. In situations when the strongest channel is via a reflection (i.e. LOS is shadowed), the prior art will fail to establish a connection. In our case the BT AoA can be configured to identify also redundant reflections.

One can naturally achieve more with a synchronized solution where the LIS beam is controlled by the communication protocol, e.g. multi user capability. This will, however, be far more expensive as the LIS reflector would need a digital baseband where the elements in the reflector need to support multiple modes (receive/transmit/reflect). Furthermore, such approach would, also need standardization enhancement.

The proposed approach may be very interesting for a gaming scenario where a gamer with a VR-headset needs a reliable high data-rate connection in a highly mobile situation. The LIS may direct the reflected beam toward the user based on BT-AoA technology such that the gamer may be illuminated from more than one direction such that obstacles do not hinder the mm-wave communication.

Summarizing, at least the following examples have been described above:

EXAMPLE 1. A method of operating a re-configurable reflective device, RRD, the RRD being re-configurable to provide multiple spatial filters, each one of the multiple spatial filters being associated with a respective input spatial direction from which incident signals on a data radio channel are accepted and with a respective output spatial direction into which the incident signals are reflected by the RRD, the method comprising:
receiving, by the RRD from a first communication node, CN1, in particular from a wireless communication device, UE, on a positioning radio channel different from the data radio channel, a CN1 reference signal,
determining, by the RRD, an estimated CN1 angle of arrival of the CN1 reference signal, and
re-configuring the RRD based on the estimated CN1 angle of arrival.

EXAMPLE 2. The method of EXAMPLE 1,
wherein re-configuring the RRD comprises using a pre-defined codebook for setting a given CN1 spatial direction of the RRD to correspond to the estimated CN1 angle of arrival,
wherein the given CN1 spatial direction corresponds to either an input spatial direction of the RRD or an output spatial direction of the RRD.

EXAMPLE 3. The method of EXAMPLE 2,
wherein the predefined codebook comprises multiple entries associated with different frequencies of the data radio channel for setting the given CN1 spatial direction of the RRD to correspond to the estimated CN1 angle of arrival.

EXAMPLE 4. The method of any one of the preceding EXAMPLES,
wherein re-configuring the RRD comprises using a frequency of the data radio channel for calculating a configuration for setting a given CN1 spatial direction of the RRD to correspond to the estimated CN1 angle of arrival,
wherein the given CN1 spatial direction corresponds to either an input spatial direction of the RRD or an output spatial direction of the RRD.

EXAMPLE 5. The method of any one of EXAMPLES 2 to 4,
wherein re-configuring the RRD comprises:
performing, by the RRD, while using the given CN1 spatial direction, an input sweep comprising changing the input spatial direction if the given CN1 spatial direction corresponds to an output spatial direction, or
an output sweep comprising changing the output spatial direction if the given CN1 spatial direction corresponds to an input spatial direction.

EXAMPLE 6. The method of EXAMPLE 5, further comprising:
synchronizing a timing of the input sweep with a timing of a receive beam sweep of the CN1, or
synchronizing a timing of the output sweep with a timing of a transmit beam sweep of the CN1.

EXAMPLE 7. The method of EXAMPLE 5 or 6,
wherein the timing of the input sweep is synchronized with the timing of the receive beam sweep based on a predefined reference timing of the receive beam sweep in accordance with a communication protocol associated with the data radio channel and/or based on control signaling between the RRD and the CN1, or
wherein the timing of the output sweep is synchronized with the timing of the transmit beam sweep based on a predefined reference timing of the receive beam sweep in accordance with a communication protocol associated with the data radio channel and/or based on control signaling between the RRD and a second communication node, CN2.

EXAMPLE 8. The method of any one of EXAMPLES 5 to 7,
wherein a sweep rate of the input beam sweep is aligned with a sweep rate of the receive sweep, or
wherein a sweep rate of the output beam sweep is aligned with a sweep rate of the transmit sweep.

EXAMPLE 9. The method of any one of EXAMPLES 5 to 8, further comprising:
receiving, from the CN1, on the positioning radio channel, at least one signal indicative of a detection of a reflected incident signal during the input sweep, or
receiving, from a second communication node, CN 2, on the or a further positioning radio channel, at least one signal indicative of a detection of a reflected incident signal during the output sweep.

EXAMPLE 10. The method of EXAMPLE 9, further comprising
  selecting a given input spatial direction based on the signal indicative of a detection of a reflected incident signal received from the CN1,
  upon selecting the given input spatial direction, commencing communicating on the data radio channel; or
  selecting a given output spatial direction based on the signal indicative of a detection of a reflected incident signal received from the CN2,
  upon selecting the given output spatial direction, commencing communicating on the data radio channel.

EXAMPLE 11. The method of any one of EXAMPLES 2 to 10,
wherein the method further comprises:
  receiving, by the RRD from a second communication node, CN2, in particular from an access node, AN, a CN2 reference signal on the or a further positioning radio channel,
  determining, by the RRD, an estimated CN2 angle of arrival of the CN2 reference signal,
  re-configuring the RRD further based on the estimated CN2 angle of arrival.

EXAMPLE 12. The method of EXAMPLE 11,
wherein re-configuring the RRD comprises using a pre-defined codebook for setting a given CN2 spatial direction of the RRD to correspond to the estimated CN2 angle of arrival,
wherein the CN2 spatial direction of the RRD corresponds to the other one of the input spatial direction or the output spatial direction of the RRD.

EXAMPLE 13. The method of EXAMPLE 12,
wherein the predefined codebook comprises multiple entries associated with different frequencies of the data radio channel for setting the given input spatial direction of the RRD to correspond to the estimated CN2 angle of arrival.

EXAMPLE 14. The method of EXAMPLE 11 or 12,
wherein re-configuring the RRD comprises using a frequency of the data radio channel for calculating a configuration for setting a given input spatial direction of the RRD to correspond to the estimated CN2 angle of arrival.

EXAMPLE 15. The method of any one of the preceding EXAMPLES, further comprising:
  requesting the CN2 to transmit the CN2 reference signal, and/or
  requesting the CN1 to transmit the CN1 reference signal.

EXAMPLE 16. The method of any one of EXAMPLES 11 to 15,
  wherein the input sweep is executed in a first mode of operation,
  wherein the determining of the estimated CN2 angle of arrival is executed in a second mode of operation,
  wherein the method further comprises:
  selecting between the first mode of operation and the second mode of operation.

EXAMPLE 17. The method of EXAMPLE 16,
  wherein said selecting is based on a relative mobility level of the CN2 with respect to the RRD.

EXAMPLE 18. The method of any one of the preceding EXAMPLES,
  wherein the data radio channel and the positioning radio channel are offset in frequency.

EXAMPLE 19. The method of any one of the preceding EXAMPLES,
  wherein the positioning radio channel is at least one of a Bluetooth radio channel, a WiFi channel, or an ultra-wideband radio channel, and/or
  wherein the data radio channel is a 5G NR channel, in particular a 5G NR channel in Frequency Range 2.

EXAMPLE 20. The method of any one of the preceding EXAMPLES, further comprising
  repetitively monitoring for the CN1 reference signal,
  repeating the determining the estimated CN1 angle of arrival of the CN1 reference signal and the re-configuring of the RRD based on the estimated CN1 angle of arrival while communicating on the data radio channel.

EXAMPLE 21. The method of EXAMPLE 20,
  wherein the repeating is performed without synchronization to transmission intervals of a communication protocol of the data radio channel.

EXAMPLE 22. The method of any one of the preceding EXAMPLES 11 to 21, further comprising
  repetitively monitoring for the CN2 reference signal,
  repeating the determining the estimate CN2 angle of arrival of the CN2 reference signal and the re-configuring of the RRD based on the estimated CN2 angle of arrival while communicating on the data radio channel.

EXAMPLE 23. The method of EXAMPLE 22,
  wherein the repeating is performed without synchronization to transmission intervals of a communication protocol of the data radio channel.

EXAMPLE 24. The method of any one of the preceding EXAMPLES,
wherein determining an estimated CN1 angle of arrival of the CN1 reference signal comprises
  determining one or more candidate CN1 angle of arrivals of the CN1 reference signal, and
  selecting one of the one or more candidate CN1 angles of arrival as estimated CN1 angle of arrival.

EXAMPLE 25. The method of EXAMPLE 21, wherein the method further comprises
  selecting a different one of the one or more candidate CN1 angles of arrival as estimated CN1 angle of arrival in response to receiving a trigger signal from the CN1.

EXAMPLE 26. The method of any one of EXAMPLES 11 to 25,
wherein determining an estimated CN2 angle of arrival of the CN2 reference signal comprises
  determining one or more candidate CN2 angle of arrivals of the CN2 reference signal, and
  selecting one of the one or more candidate CN2 angles of arrival as estimated CN2 angle of arrival.

EXAMPLE 27. The method of EXAMPLE 26, wherein the method further comprises
  selecting a different one of the one or more candidate CN2 angles of arrival as estimated CN2 angle of arrival in response to receiving a trigger signal from the CN1.

EXAMPLE 28. A method for operating a CN1, wherein the CN1 is adapted for communicating with a CN2 on a data radio channel, the method comprising
  transmitting, by the CN1, on a positioning radio channel different from the data radio channel, a CN1 reference signal.

EXAMPLE 29. The method of EXAMPLE 28, further comprising
receiving a request to transmit the CN1 reference signal, and
transmitting the CN1 reference signal in response to the request.

EXAMPLE 30. The method of EXAMPLE 28 or 29, performing, by the CN1, a receive beam sweep,
transmitting, by the CN1 to an RRD, wherein the RRD is re-configurable to provide multiple spatial filters, wherein each one of the multiple spatial filters is associated with a respective input spatial direction from which incident signals on a data radio channel are accepted and with a respective output spatial direction into which the incident signals are reflected by the RRD, at least one signal indicative of a detection of a reflected incident signal.

EXAMPLE 31. The method of any one of EXAMPLES 28 to 30, wherein the method further comprises
transmitting, by the CN1 to the RRD, a trigger signal triggering the RRD to select a different one of the one or more candidate CN1 angles of arrival as estimated CN1 angle of arrival than the currently selected candidate CN1 angle of arrival.

EXAMPLE 32. The method of any one of EXAMPLES 28 to 31, wherein the CN1 is a wireless communication device, UE, or an access node, AN.

EXAMPLE 33. A re-configurable reflective device, RRD, wherein the RRD is re-configurable to provide multiple spatial filters,
wherein each one of the multiple spatial filters is associated with a respective input spatial direction from which incident signals on a data radio channel are accepted and with a respective output spatial direction into which the incident signals are reflected by the RRD,
wherein the RRD comprises control circuitry causing the RRD to
receive, from a first communication node, CN1, on a positioning radio channel different from the data radio channel, a CN1 reference signal,
determine an estimated CN1 angle of arrival of the CN1 reference signal,
re-configure the RRD based on the estimated UE angle of arrival.

EXAMPLE 34. A re-configurable reflective device, RRD, in particular the RRD according to EXAMPLE 33,
wherein the RRD is re-configurable to provide multiple spatial filters,
wherein each one of the multiple spatial filters is associated with a respective input spatial direction from which incident signals on a data radio channel are accepted and with a respective output spatial direction into which the incident signals are reflected by the RRD,
wherein the RRD comprises control circuitry causing the RRD to perform a method according to any one of EXAMPLES 1 to 27.

EXAMPLE 35. A first communication node, CN1, in particular a wireless communication device, UE,
wherein the CN1 is adapted for communicating with a second communication node, CN2, in particular an access node, AN, on a data radio channel,
wherein the CN1 comprises control circuitry causing the CN1 to transmit, on a positioning radio channel different from the data radio channel, a CN1 reference signal.

EXAMPLE 36. A first communication node, CN1, in particular a wireless communication device, UE, in particular the CN1 according to EXAMPLE 35,
wherein the CN1 is adapted for communicating with a second communication node, CN2, in particular an access node, AN, on a data radio channel,
wherein the CN1 comprises control circuitry causing the CN1 to perform a method according to any one of EXAMPLES 28 to 32.

EXAMPLE 37. A second communication node, CN2, in particular an access node, AN,
wherein the CN2 is adapted for communicating with a first communication node, CN1, in particular a wireless communication device, UE, on a data radio channel,
wherein the CN2 comprises control circuitry causing the CN2 to transmit, on a positioning radio channel different from the data radio channel, a CN2 reference signal.

EXAMPLE 38. A second communication node, CN2, in particular an access node, AN, in particular the CN2 of EXAMPLE 39,
wherein the CN2 is adapted for communicating with a first communication node, CN1, in particular a wireless communication device, UE, on a data radio channel,
wherein the CN2 comprises control circuitry causing the CN2 to perform a method according to any one of EXAMPLES 28 to 32.

EXAMPLE 39. A communication system,
wherein the communication system comprises
an RRD according to EXAMPLE 33 or 34,
a CN1 according to EXAMPLE 35 or 36, and
a CN2 according to EXAMPLE 37 or 38.

The invention claimed is:

1. A method of operating a coverage-extender for a transmitter node in a wireless communication system, the coverage-extender being re-configurable to provide multiple spatial filters, each one of the multiple spatial filters being associated with a respective input spatial direction from which incident signals on a data radio channel are accepted and with a respective output spatial direction into which the incident signals are reflected by the coverage-extender, the method comprising:
receiving, by the coverage-extender from a first communication node (CN1) on a positioning radio channel different from the data radio channel, a CN1 reference signal,
determining, by the coverage-extender, an estimated CN1 angle of arrival of the CN1 reference signal,
re-configuring the coverage-extender based on the estimated CN1 angle of arrival.

2. The method of claim 1,
wherein re-configuring the coverage-extender comprises using a predefined codebook for setting a given CN1 spatial direction of the coverage-extender to correspond to the estimated CN1 angle of arrival,
wherein the given CN1 spatial direction corresponds to either an input spatial direction of the coverage-extender or an output spatial direction of the coverage-extender.

3. The method of claim 1,
wherein re-configuring the coverage-extender comprises using a frequency of the data radio channel for calculating a configuration for setting a given CN1 spatial direction of the coverage-extender to correspond to the estimated CN1 angle of arrival, wherein the given CN1 spatial direction corresponds to either an input spatial direction of the coverage-extender or an output spatial direction of the coverage-extender.

4. The method of claim 2, wherein re-configuring the coverage-extender comprises:
performing, by the coverage-extender, while using the given CN1 spatial direction, an input sweep comprising changing the input spatial direction if the given CN1 spatial direction corresponds to an output spatial direction, or an output sweep comprising changing the output spatial direction if the given CN1 spatial direction corresponds to an input spatial direction.

5. The method of claim 4, further comprising:
synchronizing a timing of the input sweep with a timing of a receive beam sweep of the CN1, or
synchronizing a timing of the output sweep with a timing of a transmit beam sweep of the CN1.

6. The method of claim 4,
wherein a sweep rate of the input beam sweep is aligned with a sweep rate of the receive sweep, or
wherein a sweep rate of the output beam sweep is aligned with a sweep rate of the transmit sweep.

7. The method of any claim 4, further comprising:
receiving, from the CN1, on the positioning radio channel, at least one signal indicative of a detection of a reflected incident signal during the input sweep, or
receiving, from a second communication node (CN2) on the or a further positioning radio channel, at least one signal indicative of a detection of a reflected incident signal during the output sweep.

8. The method of claim 7, further comprising
selecting a given input spatial direction based on the signal indicative of a detection of a reflected incident signal received from the CN1,
upon selecting the given input spatial direction, commencing communicating on the data radio channel; or
selecting a given output spatial direction based on the signal indicative of a detection of a reflected incident signal received from the CN2,
upon selecting the given output spatial direction, commencing communicating on the data radio channel.

9. The method of claim 2, wherein the method further comprises:
receiving, by the coverage-extender from a or the second communication node (CN2) a CN2 reference signal on the or a further positioning radio channel,
determining, by the coverage-extender, an estimated CN2 angle of arrival of the CN2 reference signal,
re-configuring the coverage-extender further based on the estimated CN2 angle of arrival.

10. The method of claim 1, further comprising:
requesting the CN1 to transmit the CN1 reference signal.

11. The method of claim 9,
wherein the input sweep is executed in a first mode of operation,
wherein the determining of the estimated CN2 angle of arrival is executed in a second mode of operation,
wherein the method further comprises:
selecting between the first mode of operation and the second mode of operation.

12. The method of claim 11, wherein said selecting is based on a relative mobility level of the CN2 with respect to the coverage-extender.

13. The method of claim 1, wherein the data radio channel and the positioning radio channel are offset in frequency.

14. The method of claim 1,
wherein the positioning radio channel is at least one of a Bluetooth radio channel, a WiFi channel, or an ultra-wideband radio channel, and/or
wherein the data radio channel is a 5G NR channel, in particular a 5G NR channel in Frequency Range 2.

15. The method of claim 1, further comprising
repetitively monitoring for the CN1 reference signal,
repeating the determining the estimated CN1 angle of arrival of the CN1 reference signal and the re-configuring of the coverage-extender based on the estimated CN1 angle of arrival while communicating on the data radio channel.

16. The method of claim 1, wherein determining an estimated CN1 angle of arrival of the CN1 reference signal comprises
determining one or more candidate CN1 angle of arrivals of the CN1 reference signal, and
selecting one of the one or more candidate CN1 angles of arrival as estimated CN1 angle of arrival.

17. The method of claim 16, wherein the method further comprises
selecting a different one of the one or more candidate CN1 angles of arrival as estimated CN1 angle of arrival in response to receiving a trigger signal from the CN1.

18. A coverage-extender for a transmitter node in a wirless communication system, wherein the coverage-extender is re-configurable to provide multiple spatial filters, wherein each one of the multiple spatial filters is associated with a respective input spatial direction from which incident signals on a data radio channel are accepted and with a respective output spatial direction into which the incident signals are reflected by the coverage-extender,
wherein the coverage-extender comprises control circuitry causing the coverage-extender to
receive, from a first communication node (CN1) on a positioning radio channel different from the data radio channel, a CN1 reference signal,
determine an estimated CN1 angle of arrival of the CN1 reference signal,
re-configure the coverage-extender based on the estimated UE angle of arrival.

19. The coverage-extender of claim 18, wherein the coverage-extender is a re-configurable reflective device (RRD).

20. The coverage extender of claim 18, wherein the transmitter node is implemented by a base station.

* * * * *